US010766515B2

(12) United States Patent
    Lin

(10) Patent No.: US 10,766,515 B2
(45) Date of Patent: Sep. 8, 2020

(54) MOVABLE VEHICLE CAPABLE OF CARRYING STACKABLE CHAIRS

(71) Applicant: Dongguan Shichang Metals Factory Ltd., Dongguan (CN)

(72) Inventor: Chenkang Lin, Dongguan (CN)

(73) Assignee: Dongguan Shichang Metals Factory Ltd., Dongguan (CN)

( * ) Notice: Subject to any disclaimer, the term of this patent is extended or adjusted under 35 U.S.C. 154(b) by 0 days.

(21) Appl. No.: 16/304,333

(22) PCT Filed: Apr. 2, 2018

(86) PCT No.: PCT/CN2018/081600
    § 371 (c)(1),
    (2) Date: Nov. 26, 2018

(87) PCT Pub. No.: WO2018/192361
    PCT Pub. Date: Oct. 25, 2018

(65) Prior Publication Data
    US 2020/0031378 A1    Jan. 30, 2020

(30) Foreign Application Priority Data
    Apr. 21, 2017 (CN) .................. 2017 2 0425717 U

(51) Int. Cl.
    *B62B 3/10*        (2006.01)
(52) U.S. Cl.
    CPC ............ *B62B 3/10* (2013.01); *B62B 2202/32* (2013.01)

(58) Field of Classification Search
    CPC ......... B62B 3/00; B62B 2202/32; B62B 3/10; A47C 3/04
    See application file for complete search history.

(56) References Cited

U.S. PATENT DOCUMENTS 2,945,699 A * 7/1960 Berlye ................. B62B 3/10
                                            280/79.3
3,102,733 A * 9/1963 Burnett ................. B62B 1/12
                                            280/654
(Continued)

FOREIGN PATENT DOCUMENTS

CN      201169272         12/2008
CN      103040260 A       4/2013
(Continued)

OTHER PUBLICATIONS

Fang Wang, State Intellectual Property Office of the P.R. China, International Search Report, PCT/CN2018/081600, dated Jul. 5, 2018, China.

*Primary Examiner* — Brian L Swenson
(74) *Attorney, Agent, or Firm* — Luedeka Neely Group, P.C.

(57) ABSTRACT

A movable vehicle capable of carrying stackable chairs comprises a base frame, a roller connected to the base frame for carrying the base frame, and a supporting frame disposed in the base frame. The supporting frame has a V-shape support with an upward opening. Advantages include adjustability of the supporting frame for placing and moving the stackable chair, and the V-shape of the supporting frame can either be an upward convex column, or an upward board, so as to carry different stackable chairs.

9 Claims, 2 Drawing Sheets

(56) References Cited

U.S. PATENT DOCUMENTS

| | | | | |
|---|---|---|---|---|
| 3,338,591 | A | * | 8/1967 | Rowland ................... B62B 3/10 280/79.11 |
| 3,612,565 | A | * | 10/1971 | Zimmerman ............. B62B 1/10 280/47.24 |
| 4,010,978 | A | * | 3/1977 | Rosen ....................... A47C 3/04 297/239 |
| 4,588,202 | A | * | 5/1986 | Villaveces ................ B62B 3/00 280/124.166 |
| 5,228,824 | A | * | 7/1993 | Satoyoshi ................ A47C 3/04 414/352 |
| 6,012,704 | A | * | 1/2000 | Miller, Sr. ................ B62B 3/10 254/8 R |
| 6,637,761 | B1 | * | 10/2003 | Boettcher ................ B62B 1/12 280/47.24 |
| 2004/0108689 | A1 | * | 6/2004 | Nguyen ................... B62B 3/02 280/651 |
| 2012/0145977 | A1 | * | 6/2012 | Hufstater ............. B62B 3/0606 254/2 R |
| 2012/0153588 | A1 | * | 6/2012 | Shokouhi ................ A47C 3/04 280/79.2 |

FOREIGN PATENT DOCUMENTS

| | | | |
|---|---|---|---|
| FR | 2707579 | A3 | 1/1995 |
| GB | 1085664 | A | 10/1967 |
| JP | 2002137740 | A | 5/2002 |
| JP | 2010100240 | A | 5/2010 |

* cited by examiner

MOVABLE VEHICLE CAPABLE OF CARRYING STACKABLE CHAIRS

FIELD OF THE INVENTION

The disclosure relates to a transportation tool, and more particularly, to a movable vehicle capable of carrying stackable chairs.

BACKGROUND OF THE INVENTION

At present, the refinement of the market has brought about diversification of styles of chair products.

The existing chairs, in general, are stacked together to save space. However, when transporting stacked chairs directly on a flat plate, they can be unstable and difficult to push manually.

SUMMARY OF THE INVENTION

In order to solve the existing technical problems above, the disclosure provides a movable vehicle capable of carrying stackable chairs comprising a base frame, a roller and a supporting frame for placing and moving the stackable chairs. The roller is connected to the base frame and carries the base frame during movement. The supporting frame is arranged in the base frame and is a V-shape support with an upward opening.

In some embodiments, the angle of the V-shape is adjustable.

In some embodiments, the bottom of the supporting frame is hinged to the base frame.

In some embodiments, the supporting frame has a first supporting arm and a second supporting arm, wherein the first supporting arm is hinged with the base frame, and the second supporting arm is hinged with the first supporting arm or the base frame.

In some embodiments, the supporting frame is a set of the first supporting arm and the second supporting arm.

In some embodiments, the base frame comprises two parts connected through a horizontal rod.

In some embodiments, two sets of the supporting frame comprising the first supporting arm and the second supporting arm are respectively arranged in the two parts of the base frame.

In some embodiments, the length of the horizontal rod is adjustable.

In some embodiments, the supporting frame comprises two panels respectively supported by the first supporting arm and the second supporting arm.

In some embodiments, the movable vehicle comprises a guard bar, and the guard bar is arranged in the base frame and located outside the supporting frame.

As compared with the prior art, the disclosure has the beneficial effect that the supporting frame is additionally provided and adjusted, for placing and moving the stackable chairs. The supporting frame is preferably a V-shape support, can either be an upward convex column, or an upward board, so as to carry different stackable chairs.

BRIEF DESCRIPTION OF THE DRAWINGS

Other embodiments of the disclosure will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE EMBODIMENTS

The disclosure is further described hereinafter with reference to the drawings and specific embodiments.

LIST OF REFERENCE NUMBERS AND CORRESPONDING STRUCTURE 11 refers to base frame, and 111 refers to horizontal rod.
12 refers to roller, and 13 refers to supporting frame.
131 refers to first supporting arm, and 132 refers to second supporting arm.
14 refers to guard bar.

Figure 1:
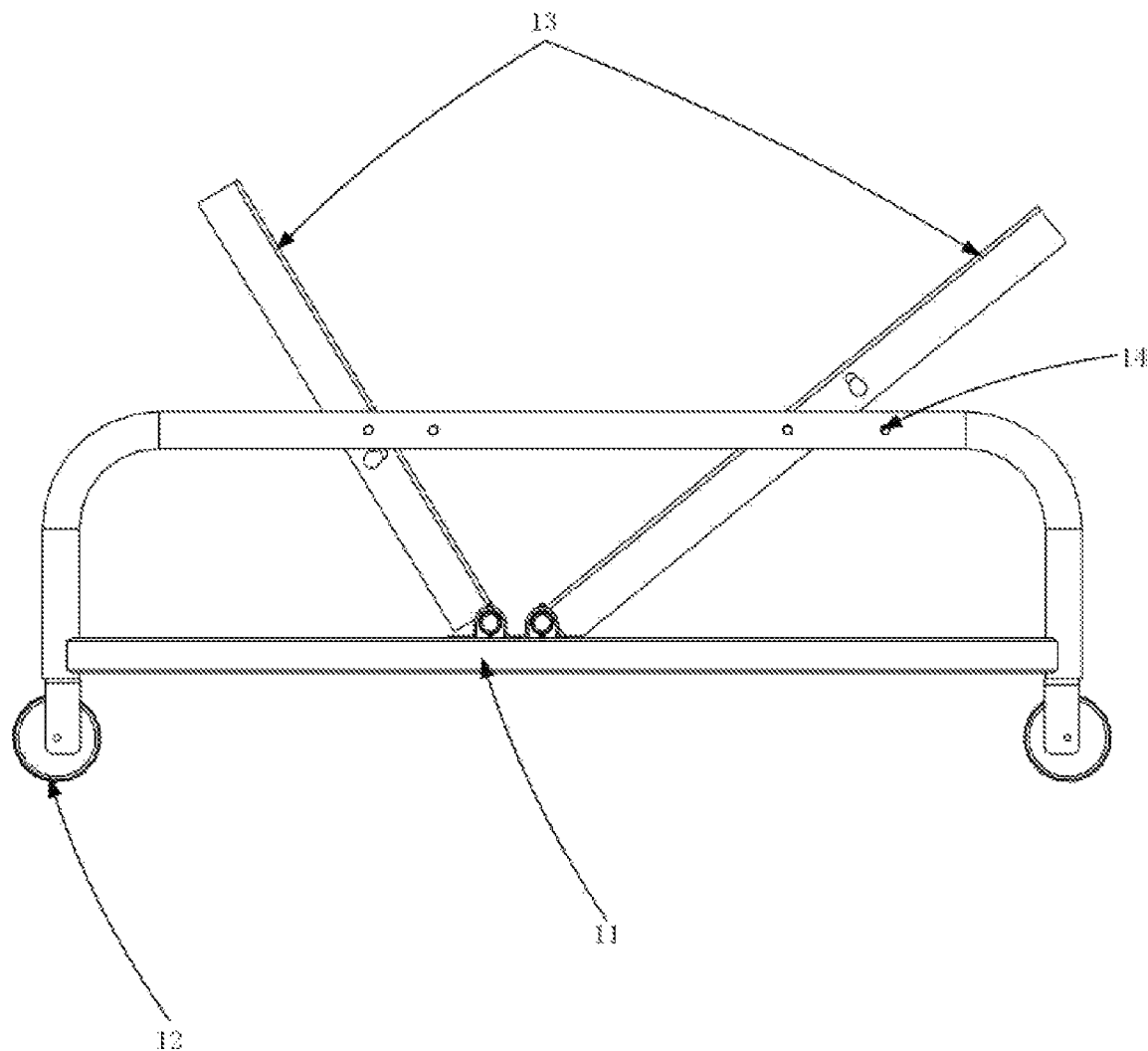
FIG. 1 is a structural schematic diagram of a movable vehicle capable of carrying a stackable chair according to the disclosure.
Figure 2:
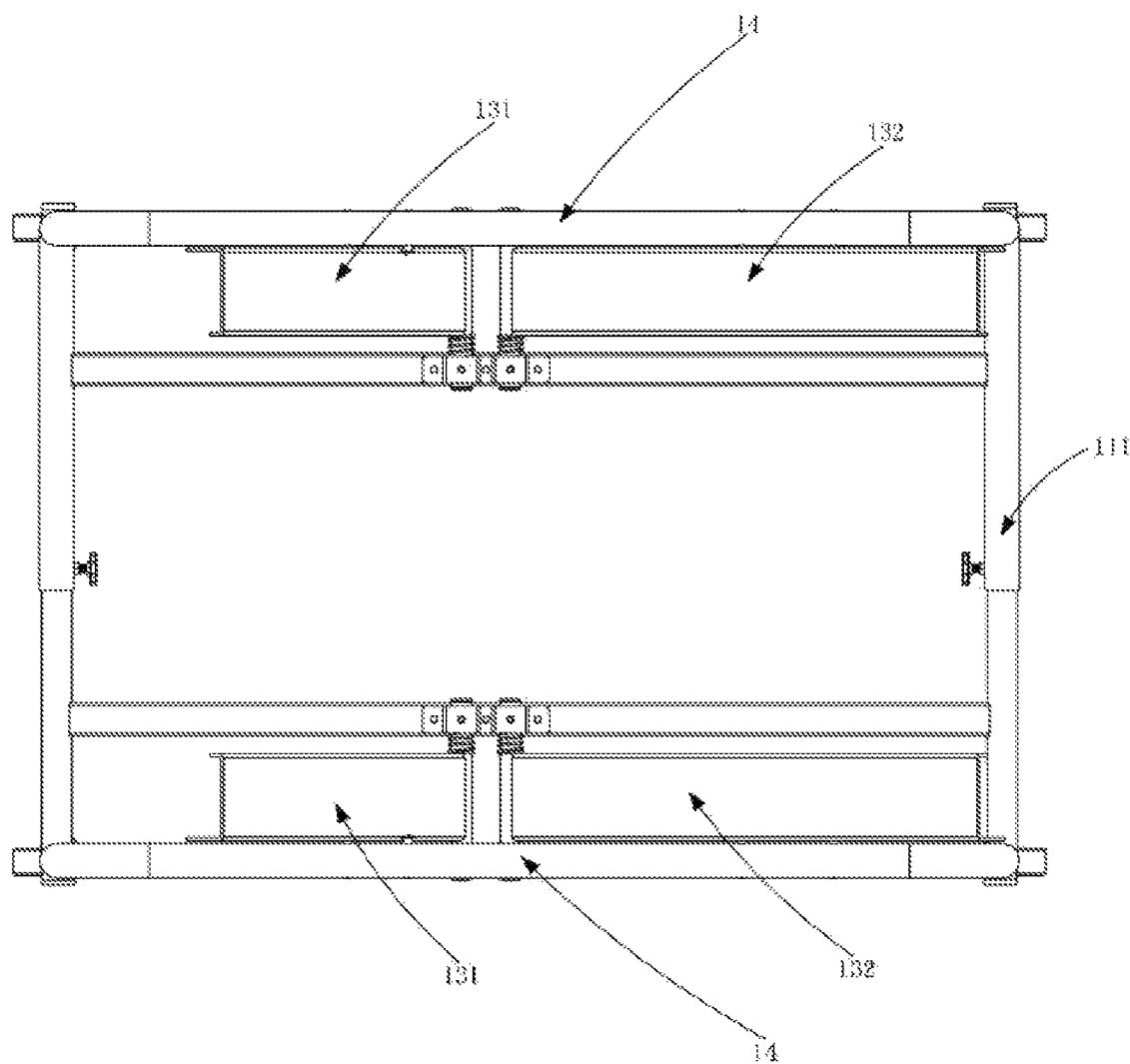
FIG. 2 is a top view of the vehicle in FIG. 1.

As shown in FIG. 1 and FIG. 2, a movable vehicle capable of carrying [[a]] stackable chairs comprises a base frame 11, a roller 12 and a supporting frame 13. The roller 12 is connected to the base frame 11 in order to carry the base frame 11 to move. The supporting frame 13 having a V-shape support with an upward opening is arranged in the base frame 11 for supporting the stackable chairs. The supporting frame 13 is additionally provided and adjusted, so that the stackable chair is placed on the supporting frame 13, and then the stackable chair is safely moved.

The angle of the V-shape is preferably adjustable to match with the stackable chair of different models.

In order to increase the flexibility of the supporting frame 13, the bottom of the supporting frame 13 is hinged to the base frame 11. Specifically, the supporting frame 13 has a first supporting arm 131 and a second supporting arm 132, wherein the first supporting arm 131 is hinged with the base frame 11, and the second supporting arm 132 is hinged with the first supporting arm 131 or the base frame 11. In this way, the first supporting arm 131 can be adjusted relative to the base frame 11, and the second supporting arm 132 can also be adjusted relative to the first supporting arm 131, so as to increase the flexibility of the supporting frame 13.

In a preferred embodiment, the supporting frame 13 is a set of the first supporting arm 131 and the second supporting arm 132, which realizes the supporting effect. Alternatively, the base frame 11 comprises two parts connected through a horizontal rod 111, and two sets of the supporting frame 13 comprising the first supporting arm 131 and the second supporting arm 132 are respectively arranged in the two parts of the base frame 11. The length of the horizontal rod 111 is adjustable. Two sets of the first supporting arms 131 and the second supporting arms 132 realize the supporting effect. The length of the supporting frame 13 is adjustable, so as to further increase the flexibility.

Except for a supporting mode of using a convex column, a supporting mode of a panel can also be used. In such supporting mode of a panel, the supporting frame 13 comprises two panels respectively carried by the first supporting arm 131 and the second supporting arm 132, and then the stackable chair is placed on the panel.

The movable vehicle capable of carrying stackable chairs of the disclosure may include a guard bar 14 that is arranged in the base frame and located outside the supporting frame 13 to prevent from sliding, so as to play the role of protection.

The foregoing are further detailed descriptions of the disclosure with reference to the specific preferred embodiments, and it should not be considered that the embodiments of the disclosure are limited to these descriptions. For those having ordinary skills in the art, some simple deduction or replacement can be made without departing from the concept of the disclosure, which shall all be included within the scope of protection of the disclosure.

The invention claimed is:

1. A movable vehicle capable of carrying stackable chairs, comprising:
   a base frame comprising first and second parts that are connected through at least one horizontal rod having a length that is adjustable;
   a roller connected to the base frame for carrying the base frame; and
   a supporting frame disposed on the base frame, the supporting frame comprising:
      a first V-shape support with an upward opening having an adjustable angle, the first V-shape support comprising a first set of a first supporting arm and a second supporting arm that are hinged to the first part of the base frame; and
      a second V-shape support with an upward opening having an adjustable angle, the second V-shape support comprising a second set of a first supporting arm and a second supporting arm that are hinged to the second part of the base frame.

2. The movable vehicle capable of carrying stackable chairs according to claim 1, wherein:
   each first supporting arm in the first and second sets is hinged with the base frame; and
   each second supporting arm in the first and second sets is hinged with the corresponding first supporting arm or the base frame.

3. The movable vehicle capable of carrying stackable chairs according to claim 1, wherein the supporting frame comprises:
   a first pair of panels, each panel of the first pair respectively supported by the first supporting arm and the second supporting arm of the first set; and
   a second pair of panels, each panel of the second pair respectively supported by the first supporting arm and the second supporting arm of the second set.

4. The movable vehicle capable of carrying stackable chairs according to claim 1 further comprising a guard bar disposed on the base frame and located outside the supporting frame.

5. A movable vehicle for carrying stackable chairs, comprising:
   a base frame comprising:
      a first part;
      a second part; and
      one or more horizontal rods that connect the first part to the second part, each of the one or more horizontal rods having a length that is adjustable;
   one or more rollers connected to the base frame for providing rolling mobility of the base frame; and
   a support frame attached to the base frame, the support frame comprising:
      a first V-shaped support comprising:
         a first support arm rotationally connected to the first part of the base frame; and
         a second support arm rotationally connected to the first part of the base frame at a first angle with respect to the first support arm; and
      a second V-shaped support comprising:
         a third support arm rotationally connected to the second part of the base frame; and
         a fourth support arm rotationally connected to the second part of the base frame at a second angle with respect to the third support arm.

6. The movable vehicle for carrying stackable chairs according to claim 5, wherein the first and second angles are adjustable.

7. The movable vehicle for carrying stackable chairs according to claim 5, wherein:
   the second support arm is rotationally connected to the first support arm; and
   the fourth support arm is rotationally connected to the third support arm.

8. The movable vehicle for carrying stackable chairs according to claim 5, further comprising:
   a first pair of panels comprising:
      a first panel supported by the first support arm; and
      a second panel supported by the second support arm; and
   a second pair of panels comprising:
      a third panel supported by the third support arm; and
      a fourth panel supported by the fourth support arm.

9. The movable vehicle for carrying stackable chairs according to claim 5 further comprising a guard bar disposed on the base frame and located outside the support frame.

* * * * *